J. J. SNIGO.
ICE CREAM CABINET.
APPLICATION FILED APR. 25, 1913.
1,112,390.
Patented Sept. 29, 1914.
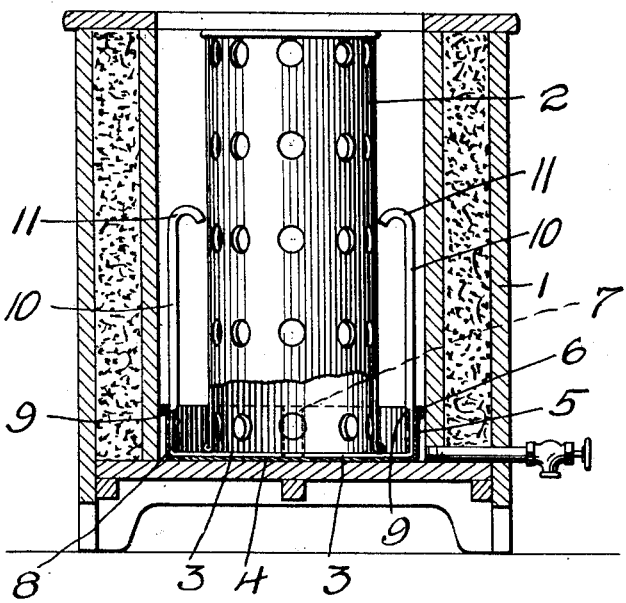
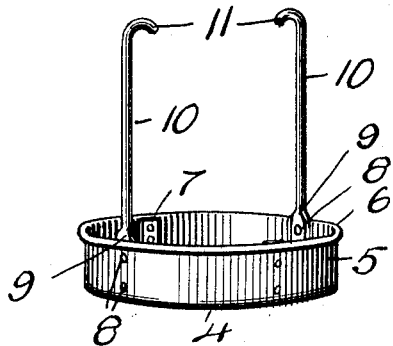
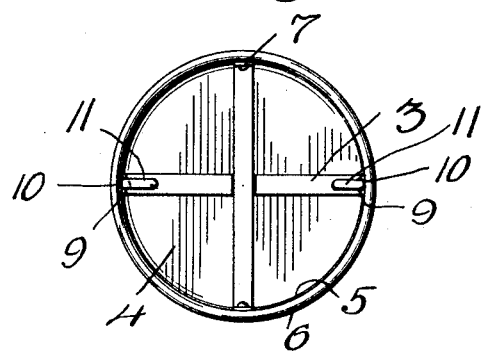
WITNESSES
INVENTOR
J. J. Snigo.
ATTORNEY

UNITED STATES PATENT OFFICE.

JAMES J. SNIGO, OF PITTSBURGH, PENNSYLVANIA.

ICE-CREAM CABINET.

1,112,390. Specification of Letters Patent. Patented Sept. 29, 1914.

Application filed April 25, 1913. Serial No. 763,534.

*To all whom it may concern:*

Be it known that I, JAMES J. SNIGO, a citizen of the United States of America, residing at Pittsburgh, in the county of Allegheny and State of Pennsylvania, have invented certain new and useful Improvements in Ice-Cream Cabinets, of which the following is a specification, reference being had therein to the accompanying drawing.

This invention relates to ice cream cabinets and more particularly to cabinets adapted for use in connection with the ordinary galvanized iron cylinders that are placed in a cabinet to protect the walls of an ice cream can placed in the cabinet.

The primary object of my invention is to furnish a cabinet with a detachable pan for supporting a galvanized iron perforated cylinder to collect dirt, salt and other matter that generally accumulates in the bottom of a cabinet and requires considerable time and labor to remove.

Another object of this invention is to provide a cylinder pan of the above type that has a reinforced or strengthened bottom that prevents the cylinder from injuring the pan.

A further object of this invention is to provide an ice cream cabinet with a detachable cylinder pan that can be easily and quickly removed and thoroughly cleansed, thereby preventing the bottom and walls of a cabinet from deteriorating by reason of mud and other foreign matter accumulating in the bottom of the cabinet.

A still further object of this invention is to provide a cylinder pan that is simple in construction, durable, inexpensive to manufacture, and applicable to various types of ice cream cabinets.

With the above and other objects in view the invention resides in the novel construction, combination and arrangement of parts to be hereinafter specifically described and then claimed.

Reference will not be had to the drawing, wherein:—

Figure 1 is a vertical sectional view of an ice cream cabinet provided with the pan, Fig. 2 is a perspective view of the detached pan, and Fig. 3 is a plan of the same.

Further describing my invention in detail with reference to the accompanying drawing, wherein like numerals denote corresponding parts throughout: 1 denotes, by way of an example, an ice cream cabinet designed for a single can, and located within the cabinet is a perforated galvanized iron cylinder 2, said cylinder also being of the ordinary and well known type.

The lower edge of the cylinder 2 rests upon transverse cleats 3 carried by the bottom 4 of a pan shell 5. The pan 5 is made of galvanized iron or non-corrodible material and the upper edges of the pan have a rimmed or wired edge 6. The cleats 3 have upturned ends 7 that are riveted or otherwise connected to the side walls of the pan and the cleats are preferably arranged at right angles to one another, with one of the cleats made in two sections whereby it can be intersected by the other cleat, as best shown in Fig. 3.

Secured to the walls of the pan 5 by rivets 8 or other fastening means are the flat ends 7 of diametrically opposed uprights 10, said uprights having the upper ends thereof provided with hooks or handles 11 which permit of the pan being easily removed from the cabinet.

It is apparent from the foregoing that foreign matter that ordinarily accumulates upon the bottom of the cabinet will accumulate in the pan and that after the cylinder has been removed the pan can be easily raised from the cabinet and cleaned. The cabinet can then be flushed in the ordinary manner without any danger of foreign matter clogging the outlet pipe of the cabinet.

One embodiment of the invention has been illustrated, but it is to be understood that the structural elements are susceptible to such variations and modifications as fall within the scope of the appended claims.

What I claim is:—

1. The combination with a protecting cylinder for an ice cream can, of a pan for supporting an ice cream can and a protecting cylinder therefor, said cylinder having a perforated body portion, said pan being of a materially greater diameter than the protecting cylinder, a pair of uprights secured to the top edge of said pan, a handle at the outer end of each upright and oppositely extending transverse cleats adapted for supporting said cylinder in said pan and having upturned ends secured to the inner face of said pan.

2. The combination with a protecting cylinder for an ice cream can, of a pan for supporting an ice cream can and a protecting cylinder therefor, said cylinder having a perforated body portion, said pan being of materially greater diameter than the said protecting cylinder, a pair of uprights secured to the top edge of said pan, a handle at the outer end of each of the uprights, said handle projecting toward the said protecting cylinder for the ice cream can, and oppositely extending transverse cleats adapted for supporting the cylinder within said pan and having upturned ends secured to the face of said pan.

In testimony whereof I affix my signature in the presence of two witnesses.

JAMES J. SNIGO.

Witnesses:
　MAX H. SROLOVITZ,
　KATHERINE ERRETT.

Copies of this patent may be obtained for five cents each, by addressing the "Commissioner of Patents, Washington, D. C."